(12) United States Patent
Hjelmstrom (10) Patent No.: US 8,937,682 B2
(45) Date of Patent: Jan. 20, 2015

(54) FOCUSING DEVICE

(71) Applicant: Axis AB, Lund (SE)

(72) Inventor: Jonas Hjelmstrom, Staffanstorp (SE)

(73) Assignee: Axis AB, Lund (SE)

( * ) Notice: Subject to any disclaimer, the term of this patent is extended or adjusted under 35 U.S.C. 154(b) by 113 days.

(21) Appl. No.: 13/846,152

(22) Filed: Mar. 18, 2013

(65) Prior Publication Data

US 2014/0002713 A1    Jan. 2, 2014

Related U.S. Application Data (60) Provisional application No. 61/668,309, filed on Jul. 5, 2012.

(30) Foreign Application Priority Data

Jul. 5, 2012    (EP) ..................... 12174556

(51) Int. Cl.
*H04N 5/225* (2006.01)
*H04N 5/232* (2006.01)
*G02B 27/10* (2006.01)

(52) U.S. Cl.
CPC ........... *H04N 5/2251* (2013.01); *H04N 5/2253* (2013.01); *H04N 5/2254* (2013.01); *Y02B 60/50* (2013.01)
USPC ........... 348/375; 348/335; 348/345; 348/360; 359/626; 359/819; 359/823; 396/133; 396/79; 396/80; 396/89

(58) Field of Classification Search
CPC ....... H04N 5/225; H04N 5/232; G02B 13/16; G02B 27/10; G02B 7/02; G03B 3/10
USPC ......... 348/345, 294, 348, 373–376, 335, 360; 359/819, 626, 823; 396/298, 342, 529, 396/79, 80, 89, 133
See application file for complete search history.

(56) References Cited

U.S. PATENT DOCUMENTS

| | | | |
|---|---|---|---|
| 4,136,821 A | 1/1979 | Sugiura et al. | |
| 5,847,886 A | 12/1998 | Spedding et al. | |

(Continued)

FOREIGN PATENT DOCUMENTS

| | | |
|---|---|---|
| DE | 1120236 | 12/1961 |
| GB | 1047320 | 11/1966 |

(Continued)

OTHER PUBLICATIONS

European Search Report mailed on Aug. 16, 2012, issued for EP Application No. 12174556.6, filed on Jul. 2, 2012 (English).

*Primary Examiner* — Tuan Ho
*Assistant Examiner* — Marly Camargo
(74) *Attorney, Agent, or Firm* — Oblon, Spivak, McClelland, Maier & Neustadt, L.L.P.

(57) ABSTRACT

The present invention relates to a focusing device comprising:
a lens, a lens plate, an image sensor, an image sensor plate, at least two rotatable structures, and at least two strips,
wherein the lens is connected to the lens plate, the image sensor is connected to the image sensor plate,
wherein each strip is arranged to be wound onto one of the rotatable structures, respectively, the rotatable structures and the strips are arranged between the lens plate and the image sensor plate, the rotatable structures and/or the strips are arranged in contact with the lens plate and the image sensor plate, and
wherein a distance between the lens and the image sensor is adjusted by winding the strips onto or off the rotatable structures.

15 Claims, 4 Drawing Sheets

(56) References Cited

U.S. PATENT DOCUMENTS

| | | | |
|---|---|---|---|
| 7,433,137 B2 * | 10/2008 | Irisawa | 359/819 |
| 7,834,311 B2 | 11/2010 | McAllister et al. | |
| 7,855,746 B2 * | 12/2010 | Iwasaki | 348/361 |
| 2012/0147197 A1 | 6/2012 | Hjelmstrom et al. | |
| 2012/0200766 A1 | 8/2012 | Hjelmstrom et al. | |
| 2013/0021617 A1 | 1/2013 | Hjelmstrom et al. | |

FOREIGN PATENT DOCUMENTS

| | | |
|---|---|---|
| JP | 2003-014908 A | 1/2003 |
| JP | 2004-226775 A | 8/2004 |
| JP | 2006-319047 A | 11/2006 |
| JP | 2007-151221 A | 6/2007 |
| WO | 2013-064281 A1 | 5/2013 |

* cited by examiner

FOCUSING DEVICE

CROSS REFERENCE TO RELATED APPLICATIONS

The present application claims the benefit of the earlier filing date of U.S. Provisional Patent Application Ser. No. 61/668,309 and EP Application No. 12174556.6, the contents of each of which being incorporated herein by reference.

TECHNICAL FIELD

The present invention relates to a focusing device.

BACKGROUND ART

In surveillance cameras, usually a first manual coarse adjustment is made on the lens focus ring. After that, a fine adjustment of the focus is performed, remotely. The fine adjustment could, e.g., be realized by moving the image sensor in relation to the lens. It is however very difficult to move an image sensor without tilting it at the same time. A problem with tilting the image sensor is that it causes parts of the resulting image to be unfocused. Furthermore, the amount of fine adjustment of the focus is not satisfactory.

SUMMARY OF THE INVENTION

In view of the above, an objective of the invention is to solve or at least reduce one or several of the drawbacks discussed above. Generally, the above objective is achieved by the attached independent patent claims. According to a first aspect, the present invention is realized by a focusing device. The focusing devise comprises: a lens, a lens plate, an image sensor, an image sensor plate, at least two rotatable structures, and at least two strips, wherein the lens is connected to the lens plate, the image sensor is connected to the image sensor plate, wherein each strip is arranged to be wound onto one of the rotatable structures, respectively, the rotatable structures and the strips are arranged between the lens plate and the image sensor plate, the rotatable structures and/or the strips are arranged in contact with the lens plate and the image sensor plate, and wherein a distance between the lens and the image sensor is adjusted by winding the strips onto or off the rotatable structures.

This is advantageous in that the risk of accidentally tilting the image sensor and/or the lens during focusing is decreased. Furthermore, a better fine adjustment of the focus is achieved.

The lens and the image sensor may be essentially parallel with each other.

The strips may be wound onto or off the rotatable structures due to rotation of the rotatable structures in relation to at least one of the lens plate and the image sensor plate.

A rotational axis of each rotatable structure may be parallel to an axis extending from a centre of at least one of the lens plate and the image sensor plate to a perimeter of at least one of the lens plate and the image sensor plate.

Each rotatable structure may have a linearly increasing radius around its perimeter from a smallest to a largest radius, and wherein a thickness of each strip corresponds to a difference between the largest radius and the smallest radius. This is advantageous in that the distance between the lens and the image sensor is adjusted continuously.

At least one of the image sensor plate and the lens plate may be stationary.

The focusing device may further comprise a holder for holding the rotatable structures at a fixed distance from each other. This is advantageous in that the amount of winding onto the respective rotatable structures in relation to each other is kept constant. Furthermore, the holder lets the rotatable structures keep their positions in relation to each other.

The holder and the rotatable structures may be connected by at least one from the group of: an axle extending from the holder into an opening of each rotatable structure, and an axle extending from each rotatable structure into the holder.

The rotatable structures may be arranged in an opening of the holder, or the rotatable structures may be arranged around the holder. Arranging the rotatable structures in an opening of the holder is advantageous in that more space is available in between the lens plate and the image sensor plate. Arranging the rotatable structures around the holder is advantageous in that less space is taken up by the focusing device.

Said rotation of the rotatable structures in relation to at least one of the lens plate and the image sensor plate may be arranged to be induced by at least one of the image sensor plate, the lens plate and the holder.

Said rotation of the rotatable structures in relation to at least one of the lens plate and the image sensor plate may be arranged to be induced by at least one of the image sensor plate, the lens plate and the holder rotating.

The focusing device may further comprise a retainer for retaining the rotatable structures within a circle within a perimeter of at least one of the lens plate and the image sensor plate.

The retainer may be at least one from the group of: the holder according to the above, a circular arched portion of at least one of the lens plate and the image sensor plate at least partially enclosing the rotatable structures, a circular brim on at least one of the lens plate and the image sensor plate arranged on an inside or an outside of the rotatable structures, and a circular brim arranged on an outside of each of the rotatable structures.

The distance between the lens and the image sensor may have a maximum value and the focusing device may comprise means for preventing the distance between the lens and the image sensor to exceed the maximum value. This is advantageous in that the strips are not wound onto the rotatable structures so much that it is not possible to wind them off again.

Said means may be at least one from the group of a mechanical stop, a stop in the winding of the strips onto the rotatable structures or a stop controlled by a central processing unit controlling the rotation of the rotatable structures in relation to at least one of the lens plate and the image sensor plate.

The focusing device may further comprise a first gear ring arranged on at least one of the lens plate and the image sensor plate and a second gear ring arranged on each rotatable structure and wherein the gear rings are arranged to engage in each other. This is advantageous in that the gear rings help running the rotation. Furthermore, the amount of winding onto the respective rotatable structures in relation to each other is kept constant.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF PREFERRED EMBODIMENTS OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
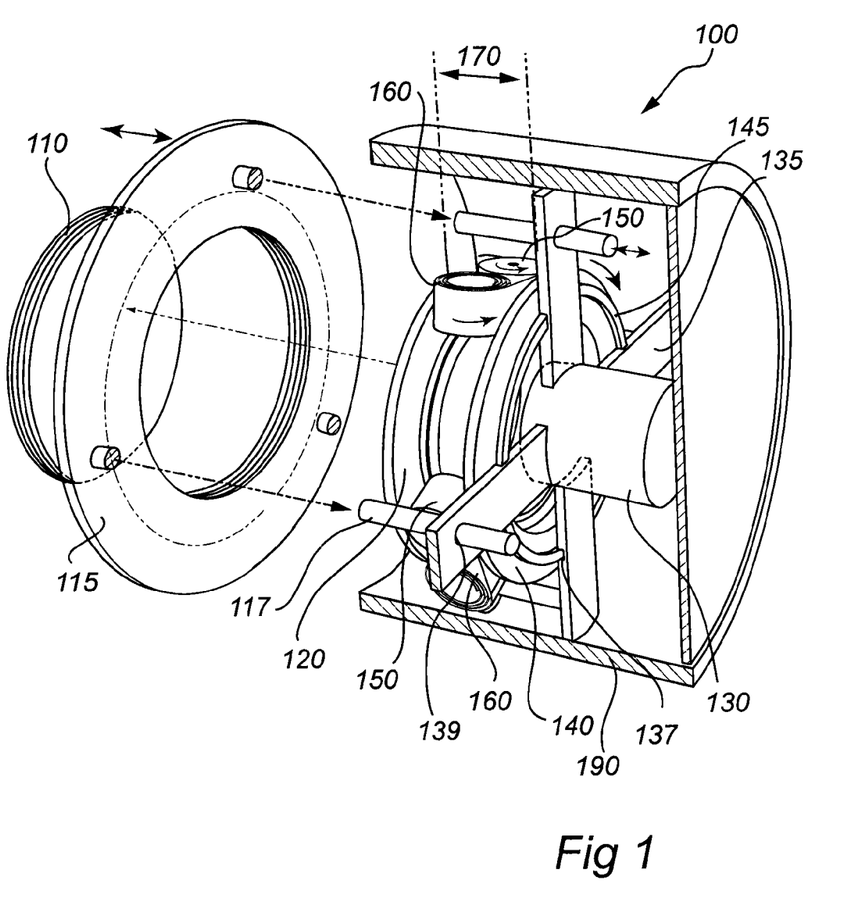
FIG. 1 is a partly exploded perspective view of the inventive focusing device.

FIG. 1 illustrates an embodiment of the inventive focusing device. The focusing device 100 comprises a lens 110, a lens holder 115, a lens plate 120, an image sensor 130, an image sensor plate 140, three rotatable structures 150, and three strips 160. The lens and the lens plate are fixed in relation to each other in a direction of an optical axis of the focusing device. If the lens plate is moved a distance in said direction, the lens is moved an equal distance in the equal direction. Furthermore, the image sensor and the image sensor plate are also fixed in relation to each other in the direction of the optical axis of the focusing device. If the image sensor plate is moved a distance in said direction, the image sensor is moved an equal distance in the equal direction.

It is to be noted that throughout this application, by referring to the lens plate 120 and/or the image sensor plate 140, is also meant a bottom plate 240, 440, 540, 640 and/or a top plate 220, 420, 520, 620.

In FIG. 1, the rotation of the rotatable structures 150 is induced by the image sensor plate 140 rotating. The image sensor plate 140 has a circular brim 145 which, during rotation, slides in groves 137 of the image sensor holder 135. In this embodiment, the lens plate 120 is stationary rotation wise in relation to the housing 190.

A distance 170 between the lens plate 120 and the image sensor plate 140 is adjusted by winding the strips 160 onto or off the rotatable structures 150. This has the effect that a distance between the lens 110 and the image sensor 130 is adjusted.

The strips can be wound onto or off the rotatable structures due to rotation of the rotatable structures in relation to at least one of the lens plate and the image sensor plate. In one embodiment, the strips can be wound onto or off the rotatable structures due to rotation of the rotatable structures in relation to both the lens plate and the image sensor plate.

The rotation of the rotatable structures in relation to at least one of the lens plate and the image sensor plate can be induced by, e.g., the image sensor plate rotating or the lens plate rotating. Preferably, the material of the strips and/or the rotatable structures, the lens plate and the image sensor plate are chosen so that frictional forces are induced in between them during rotation of the rotatable structures.

Figure 2A:
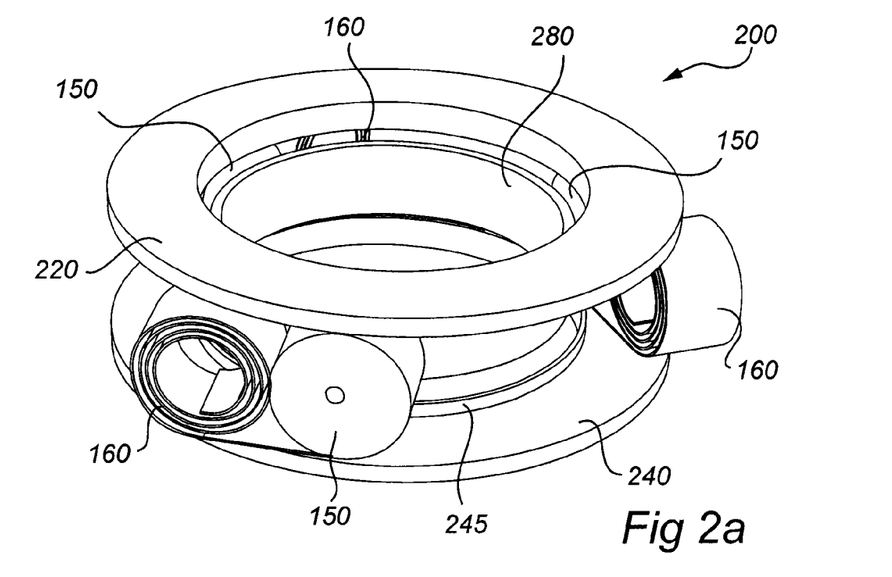
FIG. 2a is a perspective view of an embodiment of the inventive focusing device.
Figure 2B:
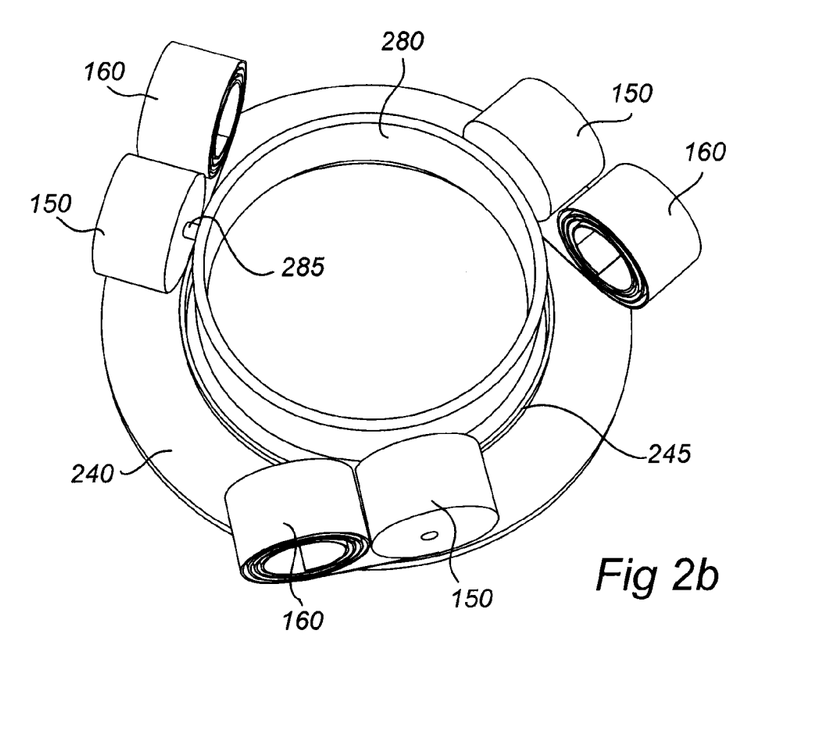
FIG. 2b is a perspective view of the embodiment of FIG. 2a but without a top plate.

The rotation of the rotatable structures in relation to at least one of the lens plate and the image sensor plate can also be induced by, e.g., the holder 280, 380. The holder 280, 380 will be explained more in detail in connection with FIGS. 2 and 3. More particularly, the rotation of the rotatable structures in relation to at least one of the lens plate and the image sensor plate is, e.g., induced by the holder 280, 380 rotating.

The lens 110 is here connected to a lens holder 115 through threaded portions in the lens 110 and in the lens holder 115. When the distance 170 is adjusted due to the rotation of the rotatable structures 150, the lens holder 115 is moved an equal distance since the lens holder 115 and the lens plate 120 are attached to each other. This causes rails 117 of the lens holder 115 to slide through openings 139 of the image sensor holder 135.

It is to be noted that all sorts of embodiments and variations are possible.

It is to be noted that any number or rotatable structures is possible, as long as there are at least two rotatable structures.

The rotatable structures can, e.g., be wheels, drums, rolls, or rollers. The strips can, e.g., be ribbons or tapes. The strips and the rotatable structures can, e.g., be made of plastic and/or metallic.

If the lens 110 and the image sensor 130 are essentially parallel with each other, this results in better the quality of the images acquired.

FIG. 2a is a perspective view of an embodiment of the inventive focusing device. The focusing device 200 comprises three rotatable structures 150 and three strips 160. The focusing device further comprises a top plate 220 and a bottom plate 240. The top plate 220 can be used as either an image sensor plate or a lens plate. The bottom plate 240 can be used as either an image sensor plate or a lens plate.

As is illustrated in, e.g., FIG. 2a, the rotatable structures 150 have a linearly increasing radius around their perimeters from a smallest to a largest radius. A thickness of each strip 160 corresponds to a difference between the largest radius and the smallest radius. This results in a smooth and even winding of the strips 160 onto and off the rotatable structures 150 and thus a smooth and continuous focusing adjustment of distance between the lens 110 and the image sensor 130.

The focusing device 200 comprises a holder 280. The holder 280 is arranged for holding the rotatable structures 150 at a fixed distance from each other. The rotatable structures 150 are arranged around the holder 280 which results in a more compact focusing device 200. The holder 280 and the rotatable structures 150 can be connected by an axle 285 extending from the holder 280 into an opening of each rotatable structure 150, and/or an axle 285 extending from each rotatable structure 150 into the holder 280. The axle 285 is illustrated in, e.g., FIG. 2b. FIG. 2b is a perspective view of the embodiment of FIG. 2a but without the top plate 220.

Figure 3:
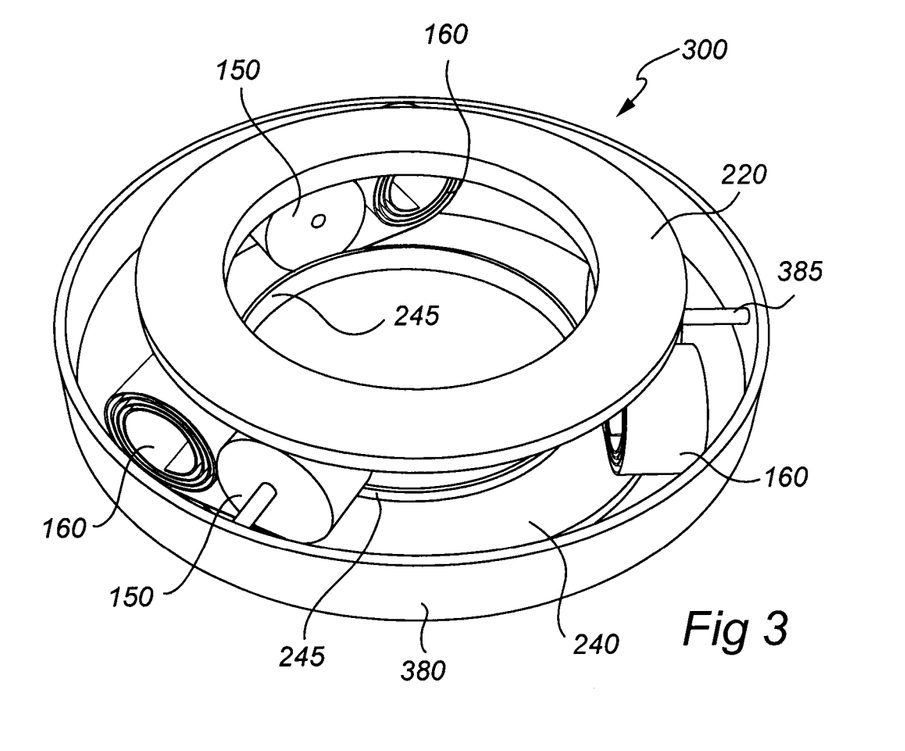
FIG. 3 is a perspective view of an embodiment of the inventive focusing device.

FIG. 3 is a perspective view of an embodiment of the inventive focusing device. The focusing device 300 comprises three rotatable structures 150 and three strips 160. The focusing device further comprises a top plate 220 and a bottom plate 240. The top plate 220 can be used as either an image sensor plate or a lens plate. The bottom plate 240 can be used as either an image sensor plate or a lens plate.

The focusing device 300 comprises a holder 380. The holder 380 is arranged for holding the rotatable structures 150 at a fixed distance from each other. The rotatable structures 150 are arranged in an opening of the holder 380. The holder 380 and the rotatable structures 150 can be connected by an axle 385 extending from the holder 380 into an opening of each rotatable structure 150, and/or an axle 385 extending from each rotatable structure 150 into the holder 380.

The inventive focusing can comprise a retainer for retaining the rotatable structures within a circle within a perimeter of at least one of the lens plate and the image sensor plate.

In the focusing device 200 of FIG. 2ab, the retainer is embodied as the holder 280 and as a circular brim 245 in the bottom plate 240 arranged on an inside of the rotatable structures 150.

In the focusing device 300 of FIG. 3, the retainer is embodied as the holder 380 and as a circular brim 245 in the bottom plate 240 arranged on an inside of the rotatable structures 150.

When the retainer is embodied as the holder, preferably, nuts are used for keeping the rotatable structures from dislodging from the holder.

Figure 4:
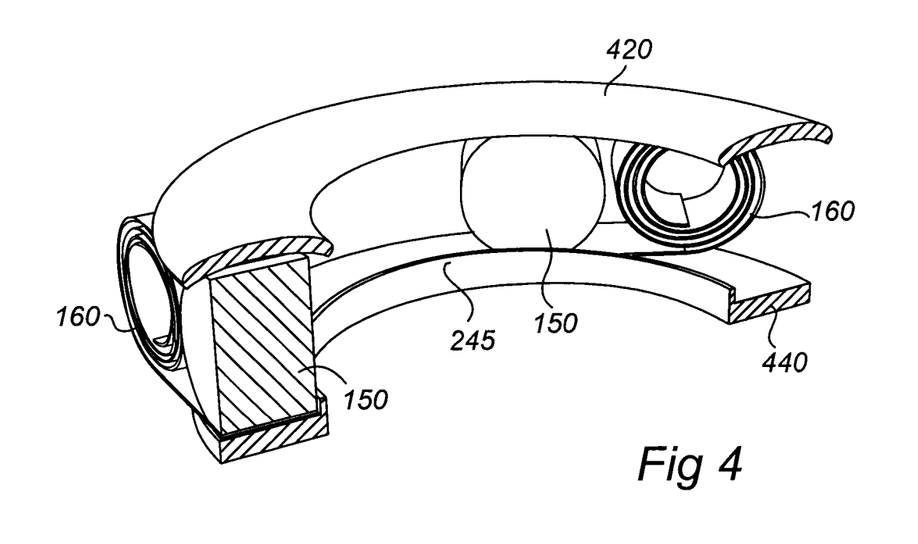
FIG. 4 is a perspective view of a cross-section of an embodiment of the inventive focusing device.

In FIG. 4, the retainer is embodied as a circular arched portion of the top plate 420 and as a circular brim 245 in the bottom plate 440 arranged on an inside of the rotatable structures 150. The circular arched portion of the top plate 420 at least partially encloses the rotatable structures 150.

Figure 5:
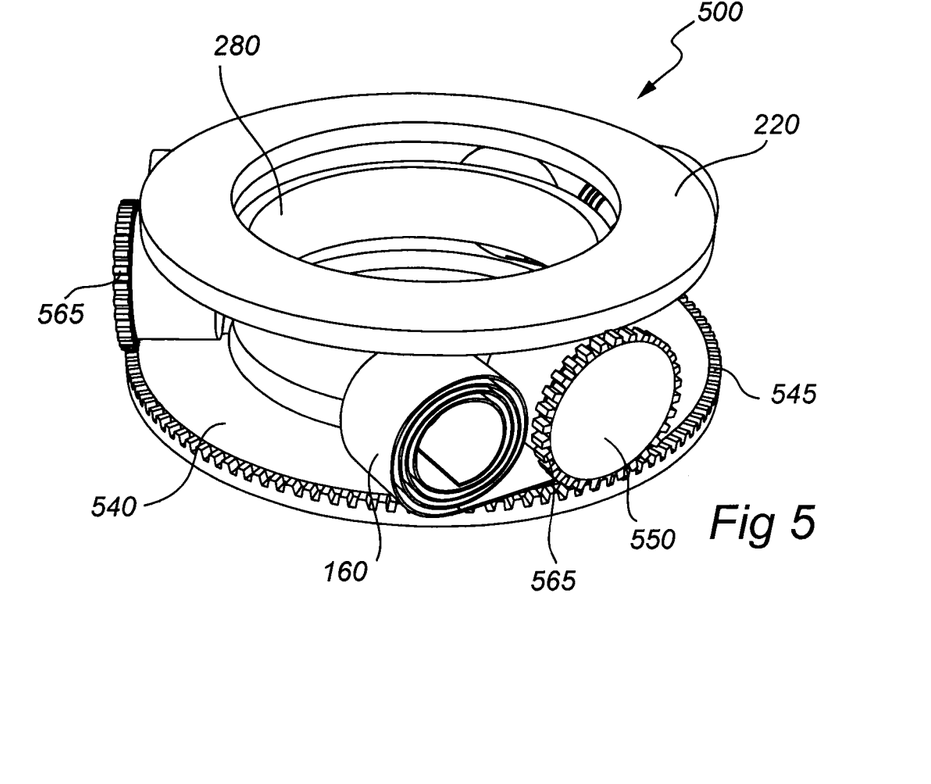
FIG. 5 is a perspective view of an embodiment of the inventive focusing device.

FIG. 5 illustrates a focusing device 500 having a top plate 220, a holder 280, a bottom plate 540, three rotatable structures 550, and three strips 160. Each rotatable structure 560 has a gear ring 565. The bottom plate 540 has a gear ring 545. The gear rings 545 and 565 are arranged to engage in each other. The gear rings can be arranged on an inside of the top plate or bottom plate and on an inside of the rotatable structures (not shown). Preferably, in this embodiment, the gear ring of the image sensor plate or the lens plate is protruding in a direction towards the other plate which is advantageous in that the gear rings engage with each other easier. Alternatively, the gear rings can be arranged on an outside of the top plate or bottom plate and on an outside of the rotatable structures. Preferably, in this embodiment, the gear ring of the image sensor plate or the lens plate is below the image sensor plate or the lens plate in a direction from the other plate which is advantageous in that the strips are not damaged by the gear ring.

Figure 6:
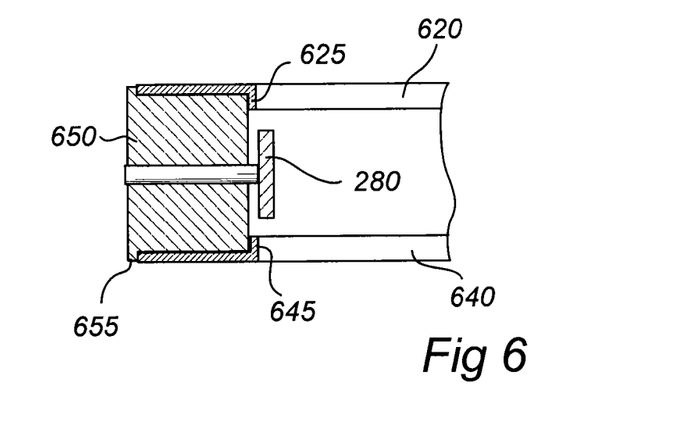
FIG. 6 is a cross-section view of an embodiment of the inventive focusing device.

FIG. 6 illustrates a rotatable structure 650 arranged in between a top plate 620 and a bottom plate 640. In this embodiment, the retainer is embodied as a circular brim 625 arranged on an inside of the top plate 620. The retainer is also embodied as a circular brim 645 arranged on an inside of the bottom plate 640. Furthermore, a retainer in the form of a holder 280 is disclosed. Additionally, the rotatable structure 650 has a circular brim 655 on an outside which is also an embodiment of a retainer.

All retainers described in FIG. 6 need not be used at once. Instead, one or more of the retainers can be used.

The rotatable structures 150 and/or the strips 160 are arranged in contact with the lens plate 120 and the image sensor plate 140. This enables the distance between the lens plate and the image sensor plate to be adjusted when winding the strips onto or off the rotatable structures. This since the diameter of the rotatable structures with the wound-on strips is increased or decreased.

The top, bottom, image sensor and lens plates need not be circular. They can, e.g., be quadratic.

A rotational axis of each rotatable structure 150 is parallel to an axis extending from a centre of at least one of the lens plate 120 and the image sensor plate 140 to a perimeter of at least one of the lens plate 120 and the image sensor plate 140.

The distance between the lens 110 and the image sensor 130 has a maximum value and wherein the focusing device 100, 200, 300, 400 comprises means for preventing the distance between the lens 130 and the image sensor 110 to exceed the maximum value. This said means is at least one from the group of a mechanical stop, a stop in the winding of the strips onto the rotatable structures or a stop controlled by a central processing unit controlling the rotation of the rotatable structures in relation to at least one of the lens plate 120 and the image sensor plate 140. This enables reuse of the focusing device after winding the strips onto the rotatable structures since it is possible to wind the strips off the rotatable structures again.

The lens plate 120 and the image sensor plate 140 are at least one from the group: of made of plastic, made of metallic, or coated with rubber.

The stop in the winding of the strips onto the rotatable structures is at least one from the group of: an end of each strip is attached to a part of the strip thus forming a loop structure, an end of each strip is bent such that it is orthogonal to the strip.

The stop in the winding of the strips onto the rotatable structures can also be described as at least one from the group of: an end of each strip is attached to a part of the strip thus forming a loop structure, an end of each strip is bent such that said end of each strip is orthogonal to the rotatable structure onto which it is wound when wound onto the rotatable structure.

It is to be noted that all embodiments and features described in this application are applicable on all aspects of the invention.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. Focusing device comprising:
    a lens, a lens plate, an image sensor, an image sensor plate, at least two rotatable structures, and at least two strips,
    wherein the lens is connected to the lens plate, the image sensor is connected to the image sensor plate,
    wherein each strip is arranged to be wound onto one of the rotatable structures, respectively, the rotatable structures and the strips are arranged between the lens plate and the image sensor plate, the rotatable structures and/or the strips are arranged in contact with the lens plate and the image sensor plate, and
    wherein a distance between the lens and the image sensor is adjusted by winding the strips onto or off the rotatable structures.

2. Focusing device according to claim 1, wherein the strips are wound onto or off the rotatable structures due to rotation of the rotatable structures in relation to at least one of the lens plate and the image sensor plate.

3. Focusing device according to claim 1, wherein a rotational axis of each rotatable structure is parallel to an axis extending from a centre of at least one of the lens plate and the image sensor plate to a perimeter of at least one of the lens plate and the image sensor plate.

4. Focusing device according to claim 1, wherein each rotatable structure has a linearly increasing radius around its perimeter from a smallest to a largest radius, and wherein a thickness of each strip corresponds to a difference between the largest radius and the smallest radius.

5. Focusing device according to claim 1, wherein at least one of the image sensor plate and the lens plate are stationary.

6. Focusing device according to claim 1, further comprising a holder for holding the rotatable structures at a fixed distance from each other.

7. Focusing device according to claim 6, wherein the holder and the rotatable structures are connected by at least one from the group of:
- an axle extending from the holder into an opening of each rotatable structure, and
- an axle extending from each rotatable structure into the holder.

8. Focusing device according to claim 6, wherein the rotatable structures are arranged in an opening of the holder, or wherein the rotatable structures are arranged around the holder.

9. Focusing device according to claim 6, wherein said rotation of the rotatable structures in relation to at least one of the lens plate and the image sensor plate is arranged to be induced by at least one of the image sensor plate, the lens plate and the holder.

10. Focusing device according to claim 9, wherein said rotation of the rotatable structures in relation to at least one of the lens plate and the image sensor plate is arranged to be induced by at least one of the image sensor plate, the lens plate and the holder rotating.

11. Focusing device according to claim 1, further comprising a retainer for retaining the rotatable structures within a circle within a perimeter of at least one of the lens plate and the image sensor plate.

12. Focusing device according to claim 11, wherein the retainer is at least one from the group of:
- a holder for holding the rotatable structures at a fixed distance from each other,
- a circular arched portion of at least one of the lens plate and the image sensor plate at least partially enclosing the rotatable structures,
- a circular brim on at least one of the lens plate and the image sensor plate arranged on an inside of the rotatable structures, and
- a circular brim arranged on an outside of each of the rotatable structures.

13. Focusing device according to claim 1, wherein the distance between the lens and the image sensor has a maximum value and wherein the focusing device comprises means for preventing the distance between the lens and the image sensor to exceed the maximum value.

14. Focusing device according to claim 13, wherein
said means is at least one from the group of a mechanical stop, a stop in the winding of the strips onto the rotatable structures or a stop controlled by a central processing unit controlling the rotation of the rotatable structures in relation to at least one of the lens plate and the image sensor plate.

15. Focusing device according to claim 1, further comprising a first gear ring arranged on at least one of the lens plate and the image sensor plate and a second gear ring arranged on each rotatable structure and wherein the gear rings are arranged to engage in each other.

* * * * *

UNITED STATES PATENT AND TRADEMARK OFFICE
CERTIFICATE OF CORRECTION

PATENT NO. : 8,937,682 B2  
APPLICATION NO. : 13/846152  
DATED : January 20, 2015  
INVENTOR(S) : Jonas Hjelmstrom Page 1 of 1

It is certified that error appears in the above-identified patent and that said Letters Patent is hereby corrected as shown below:

On the title page, Item (30), the Foreign Application Priority Data is incorrect. Item (30) should read:

-- (30)            Foreign Application Priority Data

Jul. 2, 2012         (EP)................................12174556 --

Signed and Sealed this  
Twenty-second Day of December, 2015

Michelle K. Lee  
*Director of the United States Patent and Trademark Office*